Feb. 10, 1970   J. W. PETERSON   3,494,456
ROD-TYPE BELT

Filed Oct. 6, 1967   2 Sheets-Sheet 1

INVENTOR
JAMES W. PETERSON
BY Cushman, Darby & Cushman
ATTORNEYS

Feb. 10, 1970  J. W. PETERSON  3,494,456
ROD-TYPE BELT
Filed Oct. 6, 1967  2 Sheets-Sheet 2
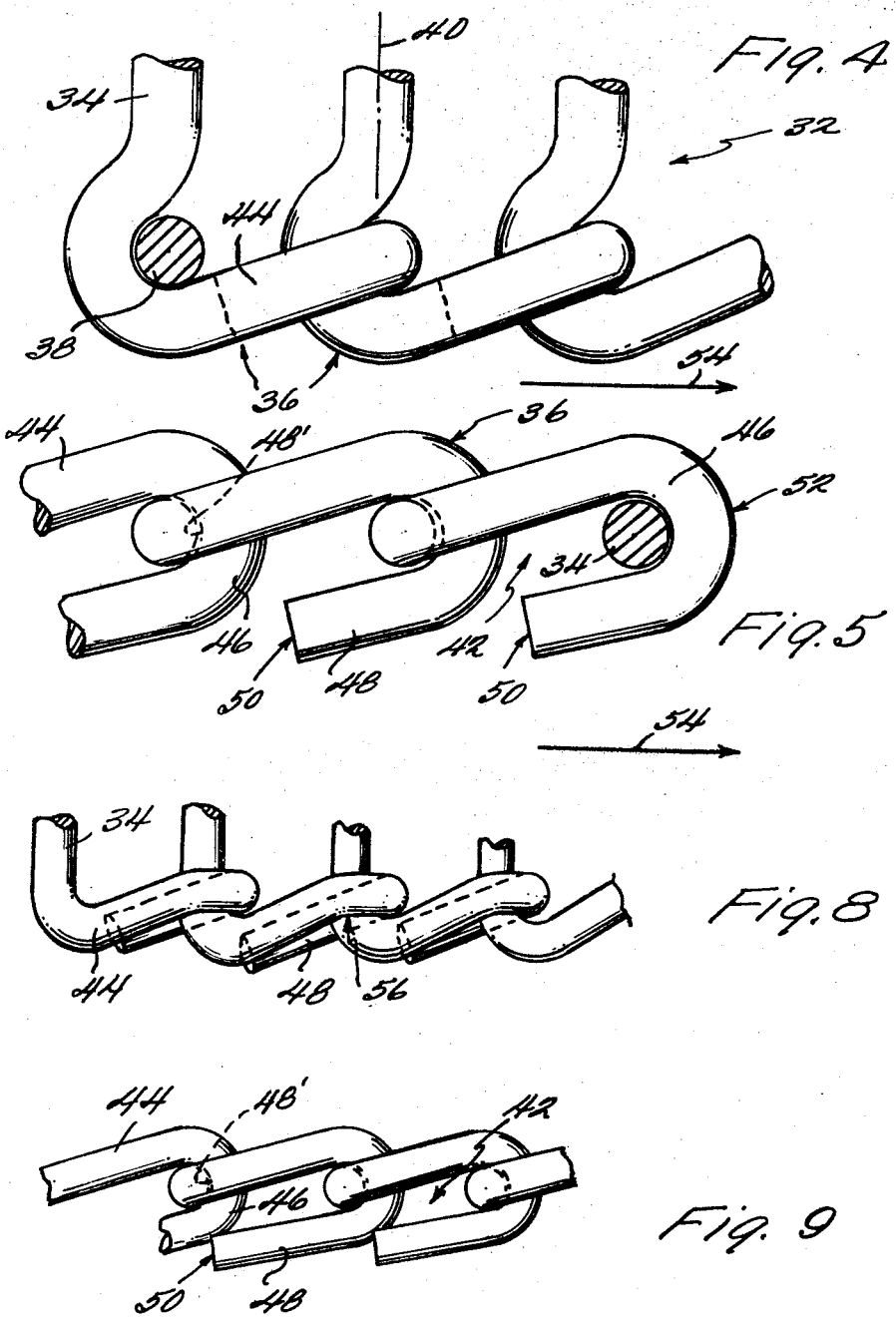
INVENTOR
JAMES W. PETERSON
BY Cushman, Darby & Cushman
ATTORNEYS

United States Patent Office 3,494,456
Patented Feb. 10, 1970

3,494,456
ROD-TYPE BELT
James W. Peterson, Cambridge, Md., assignor to Cambridge Wire Cloth Company, Cambridge, Md., a corporation of Maryland
Filed Oct. 6, 1967, Ser. No. 673,321
Int. Cl. B65g 15/54
U.S. Cl. 198—195   11 Claims

ABSTRACT OF THE DISCLOSURE

A rod-type belt capable of tracking in a straight line and simultaneously around a horizontal curve including a plurality of transversely extending, substantially parallel rods terminating at opposite ends in curled or looped sections which are connected to the adjacent forward rod, the adjacent curled sections on at least one collapsible side of the belt being mutually angled to pass each other when that side of the belt is collapsed as the belt passes around a curve.

BACKGROUND OF THE INVENTION

Rod-type belts have been employed for many years and are typically illustrated by the patent to Hatch, No. 2,555,692 of June 5, 1951. Conveyors of this type were designed for straight tracking. It is readily apparent from an examination of the Hatch patent (the design of which illustrates the prior art in FIGURES 2 and 3 of this application) that the side end of the curled section as well as the tail thereof (i.e., the free end of the curled section) would abut the adjacent curled section and prevented the belt from collapsing so that it can be gathered in a herringbone order.

The desirability of using a rod-type belt around a horizontal curve is illustrated in the patent to Cohen, No. 2,334,384 of Nov. 16, 1943. In this patent the curve segment of the rod-type belt is an entirely separate belt in which the curled or offset portions on one side of the belt are longer than the curled or offset portions on the other side of the belt. Thus, good traveling along the belt are transferred from the straight belt segment to a separate curved belt segment.

SUMMARY OF THE INVENTION

The applicant's invention relates to a new construction for the curled or looped portions of the rod-type belt which enables the belt to accommodate curved as well as straight travel. Moreover, the collapsible construction also allows easy and thorough cleaning of the belt, which is designed primarily for light-duty applications in the food industry. When the rod-type belt is placed in tension, it forms a conventional straight-line conveyor belt. However, when one side of the belt is shortened by the friction of a wall or some gathering device and when the opposite side remains in tension, the belt then operates as a turntable conveyor belt.

BRIEF DESCRIPTION OF THE DRAWINGS

FIGURE 4 is a fragmentary plan view of the rod-type belt employing the invention;
FIGURE 5 is a fragmentary side view of the rod-type belt shown in FIGURE 4;
FIGURE 8 is a fragmentary plan view of a modification of the rod-type belt shown in FIGURES 4 and 5;
and
FIGURE 9 is a fragmentary side view of a modification of the rod-type belt shown in FIGURES 4 and 5.

DESCRIPTION OF THE PREFERRED EMBODIMENTS

Figure 1:
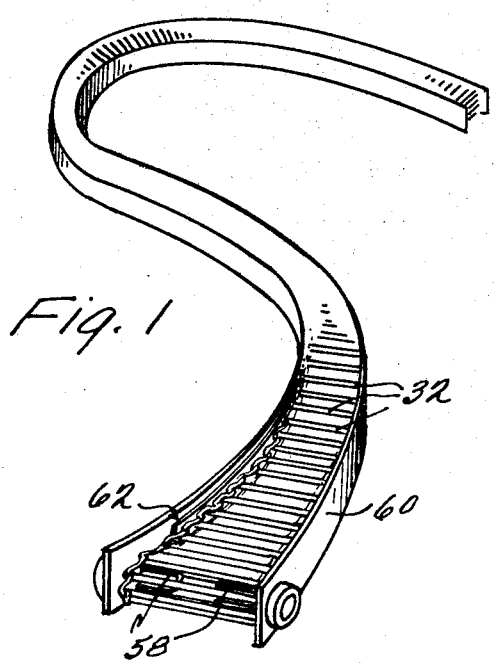
FIGURE 1 is a perspective view of a turntable rod-type belt employing the invention.

FIGURE 1 is a perspective view showing the present invention incorporated in a conveyor 10 which includes not only straight tracking but curved tracking. This feature is accomplished by making a modification of prior-rod-type belts which have been employed for many years and are illustrated in FIGURES 2 and 3.

The prior rod-type belts 12 comprise a plurality of transversely extending, substantially parallel rods 14, each terminating at opposite ends in integrally connected curled or looped sections 16. The curled or looped sections 16 comprise a first portion 18 integrally connected to the transversely extending rod 14 and a second portion 20 terminating in a free end 22 which defines the tail 24 of the curled section. The first and second portions are joined together by a root portion 26 which defines the nose 28 of the curled section. As shown particularly in FIGURE 2 the first portion 18 has a side bend at 30. When an attempt is made to collapse one side of a belt of this structure the nose of one curled section will abut either the tail of the adjacent forward curled section or the side of this curled section or both depending on the length of the second portion and the looseness of the belt structure. At any rate the belt is unable to gather in a herringbone order without interference and accordingly it cannot assume a curved path.

Figure 2:
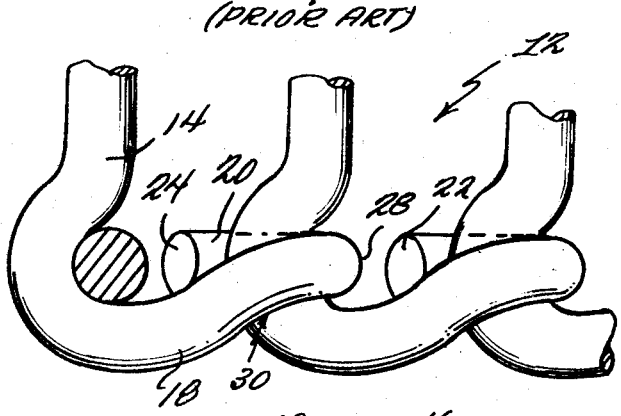
FIGURES 2 and 3 are fragmentary plan and side views respectively of prior rod-type belt.
Figure 3:
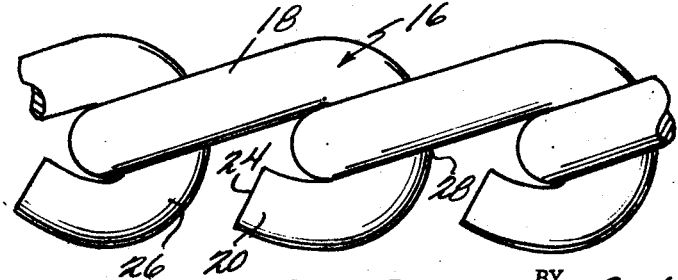

The structural differences between the prior art and the present invention are apparent from a comparison of FIGURES 4 and 5 showing the invention with FIGURES 2 and 3 representing the prior art. The belt 32 in FIGURES 4 and 5 comprises a plurality of transversely extending substantially parallel rods 34 with each of the rods terminating at opposite ends in integrally connected curled or looped sections 36 which extend generally in a longitudinal direction with respect to the major axis of the belt. Each curled section 36 encircles the adjacent forward rod 34 and is shown seated in a curved bearing seat 38 on the rod. Each rod preferably has a pair of curved bearing seats 38 adjacent its outer ends. The bearing seat is defined by a longitudinal displacement of the rod such that the major axis 40 (see FIGURE 4) of the rod is curved at that point. The curved bearing seats prevent lateral displacement of the rods with respect to each other but it should be appreciated that the collapsibility of the rod-type belt is not affected by whether the rods have a curved bearing seat or not.

The belt 32 comprising the rods 34 and curled sections 36 is fabricated from a series of straight rods which are symmetrically belt curled and connected at each end. The straight rod is initially bent at an angle greater than 90°, as, for instance, at an angle of 110°, from its original straight configuration. The bent section is then curled over itself to produce an elliptical opening 42 which is preferably opened at one end and the circumference of which is perpendicular to the original bend. The straight portion of the rod or the curved bearing seat, depending on the construction of the rods defining the transverse portion of the belt, is received in the curled elliptical opening.

The bent portion of the straight rod defines the curled section 36. In view of the fact that each straight rod is initially bent at an angle greater than 90° and that each bent section is then curled over itself, it will be seen that the curled section so formed is angularly displaced with respect to the straight longitudinal axis of the belt and is mutually angled with respect to the adjanet curled section such that it can pass the adjacent section when the belt is collapsed on one side to enable the belt to pass around a curve.

For ease in describing the structural features of the curled section, the curled section 36 is defined as having a first portion 44 integrally connected at one end to the outer end of the rod and at the other end to a root portion 46. The inner surface 48' of the root portion engages a rod when that portion of the belt is in tension. The root section is, in turn, integrally connected to a second portion 48 which is generally vertically disposed from the first portion 44 of the curled section and is angularly displaced from the straight longitudinal axis of the belt. As illustrated, the second portion lies below the first portion. The second portion 48 is preferably substantially within a vertical plane passing through the major axis of the first portion. However, it is not essential that the second portion of the curled section be in the vertical plane with the first portion. For instance, it could be partially outside this vertical plane, such as illustrated in FIGURE 8. These constructions are to be contrasted with that shown in FIGURE 2, illustrating the prior art, where the second portion 20 is aligned parallel to the straight longitudinal axis of the belt and inside the vertical plane passing through the major axis of the first portion 18.

The free end of the curled section (i.e. the free end of the second portion thereof) is defined as the tail 50 of the curled section for the purposes of illustration while the root portion 44, or more specifically the outer surface thereof, is defined as the nose 52 of the curled section.

As illustrated in the drawings by the arrow 54, the nose is the leading element of each rod. Moreover, the second portion and tail are shown on the bottom of the belt. It will be appreciated that either side of the belt could be the upper side and that the belt could be run in either direction. However, for the purposes of discussion herein, the curled sections are described as leading their respective transverse rod elements.

Figure 6:
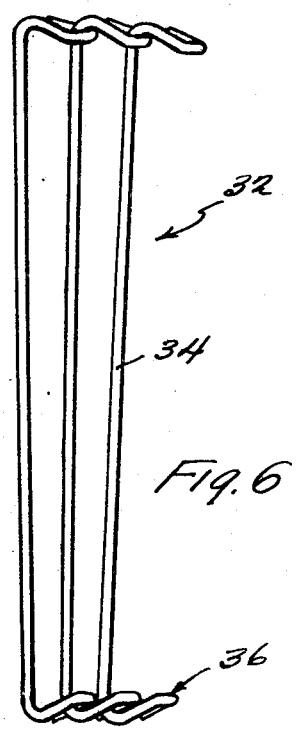
FIGURE 6 is a fragmentary plan view of the rod-type belt passing around a curve.
Figure 7:
FIGURE 7 is a fragmentary enlarged side view of the collapsed side of the rod-type belt shown in FIGURE 6.

As illustrated in FIGURES 6 and 7, the curled sections are out of alignment and mutually angled to pass each other when one side of the belt is collapsed. Thus, the second portion 48 of one curled section is out of alignment with the adjacent rearward curled section so that they can move into overlapping relation with each other. As illustrated in FIGURES 4 and 5, showing the belt in an extended position, the nose 52 of one curled section is spaced rearwardly of the tail 50 of the adjacent forward curled section. Upon collapse of one side, the nose of a curled section on that side moves into greater proximity with the tail of the adjacent forward section, and if the second portion of the adjacent forward section has sufficient length, as is preferable, the nose of the trailing curled section will overlap this second portion. On the other hand, as illustrated in FIGURE 9, the second portion could be of sufficient length so that it overlaps the trailing nose portion even in its extended position. Thus, in the embodiment shown in FIGURE 9, the nose of one curled section can be described as being spaced rearwardly from the nose of the adjacent forward curled section, and, upon collapse of the collapsible side, the two noses move into greater proximity.

As is evident from FIGURES 5 and 9, the opening 42 is formed by the inner surface 48' of the root portion 46 and the gradually converging first 44 and second 48 portions. The cross-sectional width of the opening likewise converges toward the open end of the opening, but it will be appreciated that the width thereof for at least part of the length of the opening must be greater than the diameter of the rod so that the rod can move longitudinally of the opening as the belt collapses. In the prior art, as shown in FIGURE 3, the opening will not allow the rod received therein to move longitudinally of the belt.

When one side of the belt completely collapses as illustrated in FIGURES 6 and 7, the nose 52 of the curled section abuts the adjacent forward rod 34 and prevents further collapsing of the belt. Some constructions, such as illustrated in FIGURE 8, have some side-bend in them, as at 56. The side bend 56 must be eliminated on the shorter pitch belts, but on a larger pitch belt, if the side bend is simply reduced, the belt is still able to be gathered in a herringbone order. The side bend results in the root portion being substantially parallel to the straight longitudinal axis of the belt. Depending on the amount of lateral play in the belt, it might be found in some constructions that the nose binds against the side of the adjacent curled section thereby limiting the amount of collapse. However, as stated above, it is preferable to have the amount of collapse limited only by the movement between the nose of one curled section and the adjacent forward rod.

As shown in FIGURE 1, the rod-type belt is driven by sprockets 58 operatively connected to a source of rotary power, not shown. Steel angles 60 define the sides of the conveyor, and the belt 32 itself is supported by brackets 62 secured to the steel angles. One side of the belt is collapsed by the friction of the wall on that side or by some gathering device while the opposite side remains in tension. Since the belt automatically adjusts itself to the curved path by the force exerted on the edge of the belt by the walls of the conveyor, a large tension belt may require the use of a top retaining strip to keep the flat belt in the corner sections.

It will be readily apparent that various modifications can be made in the configurations of the rod 34, the curled section 36 and the opening 42, as well as in the angular inclination of the second portion of the curled section with respect to the straight longitudinal axis of the belt.

One operative example of this novel belt consisted of a 6" wide belt of 7 gauge (.177" diameters) wire and ¾" pitch, which could operate around a curve of 2' radius.

While the preferred forms of the invention have been illustrated in the drawings and discussed above, it should be adequately clear that considerable modification may be made thereto without departing from the principles of the invention.

Therefore, the foregoing specification should be considered in an illustrative sense rather than a limiting sense, and accordingly the extent of this invention should be limited only by the spirit and the scope of the claims appended hereto.

What is claimed is:
1. A rod-type belt comprising:
   a plurality of transversely extending, substantially parallel rods, each of the rods terminating at opposite ends in integrally connected curled sections extending generally in a longitudinal direction and being curled around an adjacent rod, each curled section having a root portion within which the adjacent rod is adapted to be received and defining the nose of the curled section and a free end defining the tail of the curled section; and
   at least two adjacent curled sections on at least one side of the belt being mutually angled whereby on at least this one side of the belt the free end of one of said at least two curled sections is laterally displaced with respect to a longitudinal projection of the root portion of the other of said at least two adjacent curled sections so that this one side of the belt can collapse.

2. The rod-type belt defined in claim 1 wherein the curled sections are mutually angled so that in an extended first position on the collapsible side of the belt the nose of one curled section is spaced rearwardly of the tail of the adjacent forward curled section and upon collapse of the collapsible side into a second position the nose of the one curled section moves to greater proximity with the tail of the adjacent forward curled section.

3. The rod-type belt defined in claim 2 wherein the nose of the one curled section overlaps the tail of the adjacent forward curled section in the collapsed second position.

4. The rod-type belt defined in claim 1 wherein the curled sections are mutually angled so that in an extended first position on the collapsible side of the belt the nose of one curled section is spaced rearwardly of the nose of the adjacent forward curley section and upon collapse of the collapsible side into a second position the nose of one curled section moves to greater proximity with the nose of the adjacent forward curled section and overlaps the tail of the adjacent forward curled section.

5. The rod-type belt defined in claim 1 wherein the curled section has a first portion integrally connected to the rod and a second portion generally vertically disposed from the first portion and connected thereto by the root portion and wherein the second portion lies substantially within a vertical plane passing through the first portion.

6. The rod-type belt defined in claim 1 wherein the curled section has a first portion integrally connected to the rod and a second portion generally vertically disposed from the first portion and connected thereto by the root portion and wherein the second portion is generally angularly disposed from the straight longitudinal axis of the belt.

7. The rod-type belt defined in claim 1 wherein the curled section has a first portion integrally connected to the rod and a second portion generally vertically disposed from the first portion and connected thereto by the root portion and wherein the root portion is substantially aligned along he straight longitudinal axis of the belt and the first and second portions are substantially angularly disposed from the straight longitudinal axis of the belt.

8. The rod-type belt defined in claim 1 wherein each rod is longitudinally displaced adjacent each of its outer ends to form a pair of curved bearing seats.

9. The rod-type belt defined in claim 1 wherein each curled section has a first portion integrally connected to the rod, a second portion vertically disposed from the first portion, and a root portion connecting the first and second portions, the first and second portions substantially uniformly converging toward each other away from the root portion.

10. The rod-type belt defined in claim 1 wherein adjacent curled sections on both sides of the belt are mutually angled whereby the free ends of each curled section are laterally displaced with respect to a longitudinal projection of the root portions of adjacent curled sections so that both sides of the belt can collapse.

11. A rod-type belt comprising:
  a plurality of generally transversely extending, substantially parallel rods, each of the rods having its outer ends bent more than 90° and then curled over itself to define a curled section within which the generally transversely extending portion of the adjacent forward rod is received;
  the curled section having a first portion integrally connected to the generally transverse portion of the rod, second portion defining the curled-over portion of the curled section, and a root portion connecting the first and second portions terminating in a free end defining the tail of the curled section; and
  adjacent curled sections on each side of the belt being mutually angled whereby the free end of each curled section is laterally displaced with respect to a longitudinal projection of the root portion of the adjacent curled section so that the belt can collapse.

References Cited

UNITED STATES PATENTS

| 2,077,941 | 4/1937 | Leonard | 198—195 |
| 2,942,722 | 6/1960 | Painter | 198—195 |

FOREIGN PATENTS

| 494,143 | 6/1950 | France. | |

RICHARD E. AEGERTER, Primary Examiner